United States Patent
Kissel (10) Patent No.: US 8,333,157 B2
(45) Date of Patent: Dec. 18, 2012

(54) SYSTEM FOR AUTOMATED VEHICLE OPERATION AND CONTROL

(75) Inventor: Waldemar F. Kissel, Gainesville, FL (US)

(73) Assignee: WFK & Associates, LLC, Gainesville, FL (US)

( * ) Notice: Subject to any disclaimer, the term of this patent is extended or adjusted under 35 U.S.C. 154(b) by 69 days.

(21) Appl. No.: 12/827,544

(22) Filed: Jun. 30, 2010

(65) Prior Publication Data

US 2010/0326758 A1    Dec. 30, 2010

Related U.S. Application Data

(60) Provisional application No. 61/221,701, filed on Jun. 30, 2009.

(51) Int. Cl.
    *B61B 13/06*    (2006.01)
(52) U.S. Cl. ........ 105/72.2; 105/145; 104/242; 104/120
(58) Field of Classification Search .................. 104/105, 104/120, 130.01, 130.02, 130.04, 130.06, 104/130.07, 130.09, 242, 243, 244.1, 245, 104/246, 248, 292, 293, 294; 105/72.2, 144, 105/145, 199.2; 180/401; 280/87.2; 701/19, 701/23, 41
See application file for complete search history.

(56) References Cited

U.S. PATENT DOCUMENTS

| | | | | |
|---|---|---|---|---|
| 3,593,668 A | * | 7/1971 | Adams | 104/120 |
| 3,844,224 A | * | 10/1974 | Ishii et al. | 104/244.1 |
| 5,628,252 A | * | 5/1997 | Kuznetsov | 104/284 |
| 7,529,604 B2 | * | 5/2009 | Moriguchi | 701/23 |
| 2008/0257198 A1 | * | 10/2008 | Beck et al. | 104/284 |

* cited by examiner

*Primary Examiner* — S. Joseph Morano
*Assistant Examiner* — Zachary Kuhfuss
(74) *Attorney, Agent, or Firm* — GrayRobinson, P.A.; Michael J. Colitz, III (57) ABSTRACT

Disclosed is an automated system for controlling and operating a vehicle. The system has three primary components: a vehicle, a saddle assembly, and a railway. The saddle is firmly attached to the bottom of the vehicle. The saddle assembly engages and rides along the rail. Sensors ensure that the rail is centered within the saddle. In the event the vehicle loses traction the backbone will maintain vehicle control and stability. The vehicle can change from one roadway to another while always being secured to a railway.

9 Claims, 7 Drawing Sheets

SYSTEM FOR AUTOMATED VEHICLE OPERATION AND CONTROL

CROSS REFERENCE TO RELATED APPLICATIONS

This application claim priority to Provisional Patent Application No. 61/221,701 filed on Jun. 30, 2009 and entitled "Sensory Stabilizer Saddle." The contents of this co-pending application are fully incorporated herein.

BACKGROUND OF THE INVENTION

1. Field of the Invention

The present invention relates to a control system for a vehicle. More specifically, the invention relates to a control system that allows for fully automated and safe vehicle operations.

2. Description of the Background Art

Currently, there are a variety of technologies for automated vehicle operations. However, to date, none of these technologies have been deployed on a large scale. One suggested approach is to use a sensor to follow an implanted wire, a series of magnetic markers, a painted line, or some physical structure. Another approach is to place a detailed map in a vehicle computer and use signals from Global Positioning Satellites for vehicle position and control.

However, these and other methods for automated vehicle control have a variety of shortcomings. For example, they do not address the issue of vehicle traction, nor do they address issues related to wireless interference. These issues must be adequately addressed insomuch as any system, when deployed on a large scale, will include vehicles moving in large numbers and at high rates of speed. A fully automated vehicle control system must be able to handle this.

In known automated systems there is no means for dealing with snow, wind, ice, rain, sand, grease, any sort of slick spots. This is referred to as traction. These systems also rely on wireless communication for travel information. Wireless communication is subject to a variety of disruption. These include lightning, smoke, fire, fog, smog, mist, electromagnetic interference, radio waves, microwaves, power failure, and loss of satellite signal or loss of any signal. Failures related to traction and/or wireless interference are unacceptable and would fatally undermine, any automated system.

The present automated vehicle system overcomes these deficiencies by providing positive vehicle traction under any weather conditions and by providing fail safe control under all kinds of atmospheric conditions. Moreover, the disclosed automated system allows vehicles to be under positive control at all times even when vehicles are changing from one roadway to another.

SUMMARY OF THE INVENTION

It is one of the advantages of the present system to provide a fully automated means for operating and controlling a vehicle.

Another advantage of the present system is to permit a vehicle to be fully controlled without relying upon wireless communications.

Still yet another advantage of the present system is to allow a vehicle to maintain proper traction even in adverse conditions.

Yet another advantage is to allow a vehicle to be safely and quickly maneuvered in the absence of human control.

Another advantage is to allow a vehicle to be transferred from one roadway to another while maintaining contact with an associated rail.

These and other advantages are provided by a system wherein the vehicle is completely controlled within the vehicle itself and the system infrastructure. There is no human involvement. The vehicle may have human occupants. These could be young children or very elderly or disabled passengers unable to otherwise operate the vehicle. Speed, steering, routing, braking, turning, and all other operational parameters are controlled the system. The system is designed to operate in any and all kinds of operating conditions, including extreme cold, very high winds (including hurricanes and tornados), dust or sand storms, snow, rain, icy roads, mud or spills, and electrical storms. Other conditions could include sudden loss of power, vehicle malfunctions, electrical system failure, programming errors, hardware failure, road obstructions, and vehicle accidents.

The present system allows vehicles to be operated at a very high velocities. The present system allows the vehicle to encounter sharp turns at high speeds. The system also allows the vehicle to change lanes, or exit or cross roadways. These maneuvers can be carried out at high velocities. Moreover, the system allows vehicles to accomplish the foregoing while at the same time being in a cluster or platoon of vehicles (i.e. with other vehicles immediately in front (bumpers touching) and in back (bumpers touching)).

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

PARTS LIST

20 Automatic Vehicle Control System
22 Vehicle

24 Centerline
26 Chassis
28 On-Board Computer
32 Axle
34 Wheels
36 Electric Motors
38 Primary Steering Yoke
42 Primary Steering Actuator
44 Secondary Steering Yoke
46 Secondary Steering Actuator
48 Manual Controller
52 Sensory Stabilizer Saddle Assembly
54 Saddle Hood
56 Structural Collar
58 Sidewalls of Hood
62 Lower Edges of Hood
64 Saddle Support Rod
66 Positioning Mechanism
68 Braking Mechanism
70 Saddle Lock
72 First Group of Sensors (to monitor location of rail)
74 Second Group Sensors (to monitor for obstacles)
76 Third Sensor (to monitor vertical position of hood)
78 First Rail
82 First Pathway
84 Second Rail
86 Second Pathway
88 Third Rail
92 Third Pathway
94 First Transition Area
96 First Gap
98 Second Transition Area
102 Second Gap
104 Hill
106 Plates
108 Door
112 Hinged Door
114 Recess

DETAILED DESCRIPTION OF THE PREFERRED EMBODIMENT

The present invention relates to an automated system for controlling and operating a vehicle. The system has three primary components: a vehicle, a saddle assembly, and a backbone railway. The saddle is firmly attached to the bottom of the vehicle. The saddle assembly engages and rides along the rail. Sensors ensure that the rail is centered within the saddle. In the event the vehicle loses traction the backbone will maintain vehicle control and stability. The vehicle can change from one roadway to another while always being secured to a railway. The various components of the present invention are described in greater detail hereinafter.

Automated Vehicle

Figure 4:
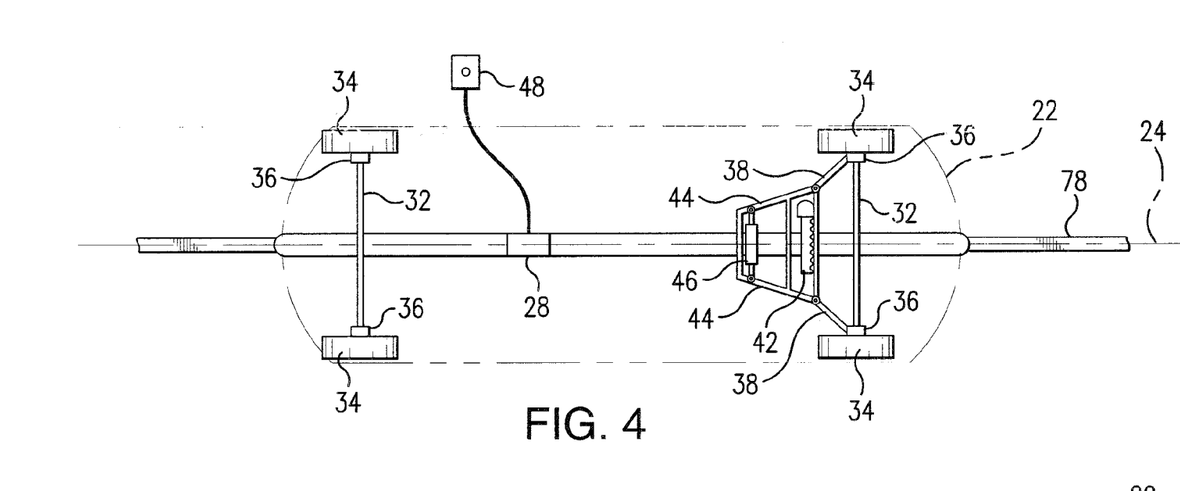
FIG. 4 is a sectional view of the vehicle of the present invention.
Figure 5:
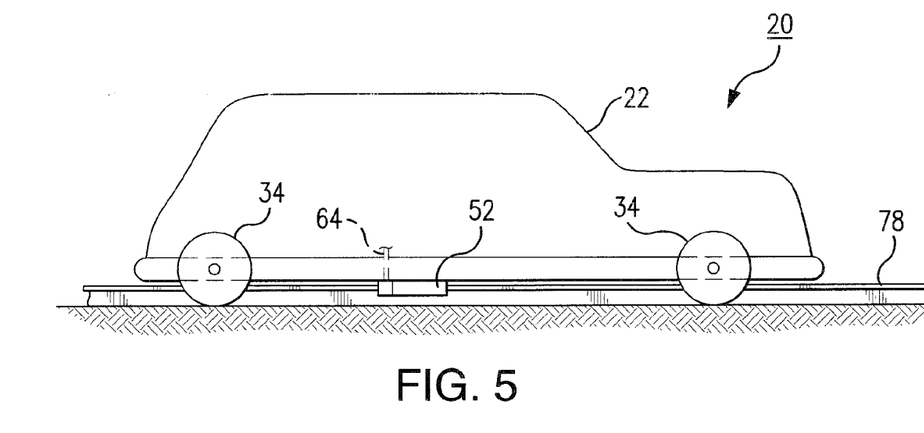
FIG. 5 is a side elevational view of the vehicle of the present invention.

The system 20 of the present invention can be utilized in connection with a wide variety of vehicles. In the preferred embodiment, however, vehicle 22 is a four wheeled electric vehicle. The vehicle 22 is defined by a centerline 24. In a manner described below, the sensors functions to keep vehicle centerline 24 aligned with an underlying rail. The vehicle 22 is further defined by a chassis 26 and a pair of axles 32. An on-board computer 28 is included for monitoring data provided by sensor and for steering vehicle 22 along the roadway. The computer 28 may also be used in carrying out a variety of other operational functions, such as air conditioning systems, entertainment systems, and/or communications.

As noted, the depicted vehicle 22 is powered electrically; however, the system 20 can also be used with gas powered vehicles. Each wheel preferably has its own motor 36 such that each wheel is independently powered. Steering may be carried out by differing the rotational velocity of the various wheels 34. Yet, in the preferred embodiment, steering is carried out via a primary steering assembly, including a primary steering yoke 38 and a primary steering actuator 42. Both the yoke 38 and actuator 42 can be operated by the computer 28 without human interaction. In the event of a malfunction or emergency, a backup or secondary steering assembly is also provided in the form of a secondary steering yoke 44 and a secondary steering actuator 46. The secondary system can be operated manually via a controller 48 or via the on-board computer 28.

Saddle Assembly

Figure 1:
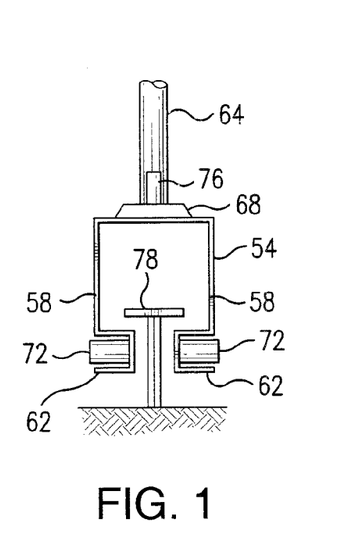
FIG. 1 is a front elevational view of the saddle assembly.
Figure 2:
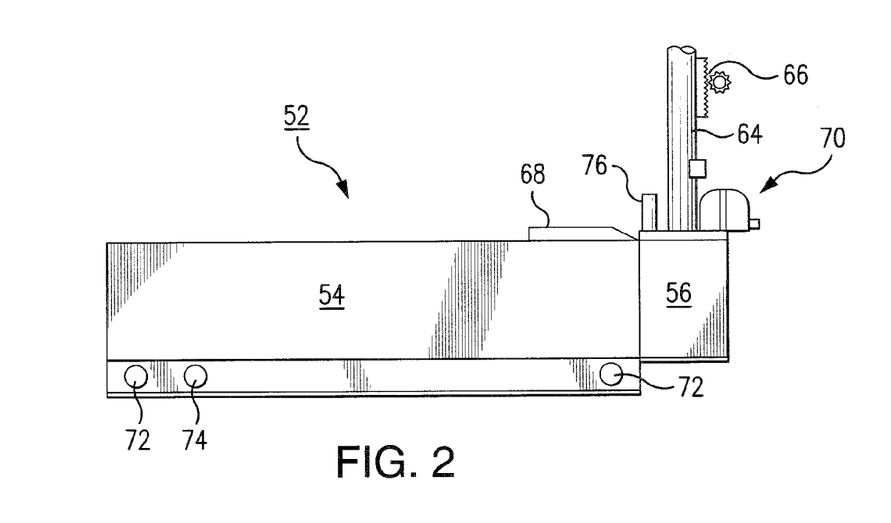
FIG. 2 is a side elevational view of the saddle assembly.
Figure 3:
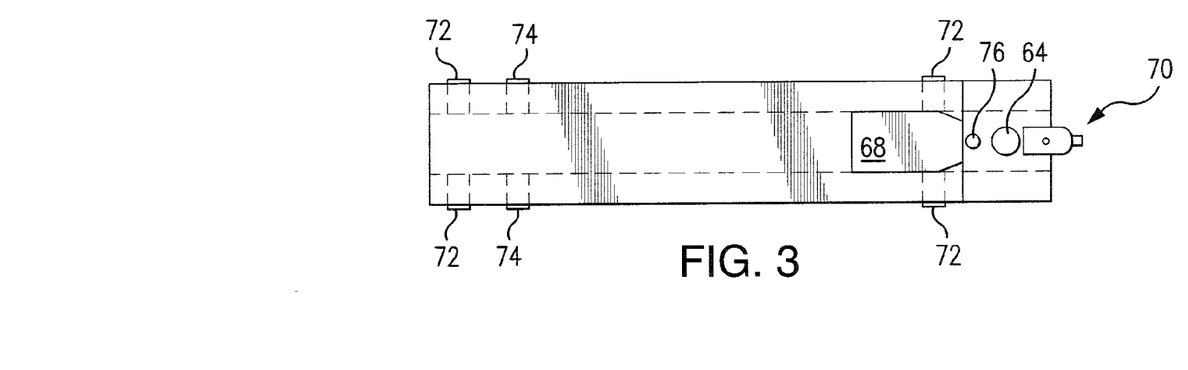
FIG. 3 is a top plan view of the saddle assembly.

A stabilizer saddle assembly 52 is secured to the underside of the vehicle chassis 26 and is adapted to engage a rail within the roadway. The saddle assembly 52 includes a saddle hood 54 and a collar 56. As depicted, the saddle hood 54 preferably includes downwardly extending sidewalls 58 that are engaged over the rail. In a preferred but non-limiting embodiment, the saddle hood 54 also includes inwardly directed lower edges 62 that are wrapped around the rail. The collar 56 is interconnected to the back end of the saddle hood 54. The saddle hood 54 is connected to a support rod 64 that is, in turn, connected to chassis 26 via a positioning mechanism 66.

The positioning mechanism 66 permits the vertically adjustment of the saddle assembly 52 relative to the chassis 26. The mechanism can be, for example, a powered rack and pinion assembly, with the rack positioned on the support rod 64 and a powered pinion positioned within the vehicle. Thus, by rotating the pinion, the support rod 64 and attached saddle assembly 52 can be vertically oriented relative to the underside of the vehicle. The positioning mechanism 66 is controlled by the on-board computer 28.

The saddle assembly 52 further includes an emergency breaking mechanism 68. The emergency breaking mechanism allows vehicle 22 to be rapidly stopped in the event of an obstacle in the roadway or in the event of a critical malfunction. The breaking mechanism 68 is intended as a back-up to the primary brakes, which may be conventional drum or disc brakes associated with each of the four wheels 34. Both the primary and the emergency brakes are under the control of the on-board computer 28. The emergency braking mechanism 68 takes the form of a wedge shaped element that is designed to be inserted between the rail and the saddle hood 54 to force vehicle 22 to rapid stop. The pad could start with a softer material and proceed to a hard material.

The saddle hood 54 also a sensor array. This array includes a first group of sensors 72 which measure the proximity of the saddle hood 54 from the inside vertical sides of the rail. There are four sensors 72 shown but there could be more or less. These could use any of a number of sensor technologies to measure proximity. In one embodiment, the sensors emit an electromagnet or electrostatic field. This field is reflected by the target, which in this case is the rail. The sensors then look for changes in the reflected field. Based upon the detected changes, the relative proximity of the target to the sensor can be computed. The data from the proximity sensor can be in analogue or digital format.

If vehicle 22 is travelling in the center of the road and tracking perfectly the signal from the proximity sensors 72 will show equal strength on both sides of the rail. Namely, the digital readouts for all four sensors 72 will be the same. Such a reading means all sensors 72 are equidistant from the rail and that the rail is aligned with the centerline 24 of the vehicle.

As the center rail begins going into a curve the vehicle onboard computer 28 will sends a signal to the primary steering actuator 42 to begin adjusting the primary steering yoke 38 to follow the curvature of the rail. The rate at which the turn is accomplished may be in the form of RPS's (revolutions per second) per a time $t_1$. The turning rate may be increasing at some rate of RPS until time $t_2$ and maintained at that level. During the turn, the sensors 72 will measure the real time location of the rail with respect to the saddle hood 54. If one or more sensors 72 start sending a stronger signal than the other sensors 72 than an imbalance has occurred. This means the rail is not centered with saddle hood 54 and the turning rate must be adjusted via the on-board computer 28.

The on-board computer 28 controls the primary steering actuator 42 to accelerate steering in the direction of the stronger signals. When the signals are in balance and the digital readouts are in agreement then the computer 28 compares its present actual angle of turning with what it should be according to the formulas and any other tables of information or position related readouts. There are always be multiple ways to confirm operating data. Using its algorithms and decision matrices the computer 28 will decide on a course of action.

If the signals from the sensors 72 indicate that the rate of directional change exceeds the capability of the primary steering actuator 42 to recover control or if the sensors 72 indicate the saddle hood 54 and collar 56 are in direct contact with the backbone (due perhaps to an irregular roadway condition such as a mud slick, grease or ice), then the secondary steering system is activated. The secondary steering system includes the secondary steering yoke 44 and secondary steering actuator 46. An additional group of sensors 74 looks for obstacles in the roadway.

The primary steering is built into the secondary steering and the secondary steering overrides the primary steering. When primary steering is in control the secondary steering is in a neutral position (set to straight ahead). The secondary steering assembly can operate faster but is less smooth than the primary. If for any reason there would be a complete failure of both steering systems the saddle hood 54 and collar 56 would ride against the backbone rail and no damage will occur. The collar 56 is strong enough to hold vehicle 22 from leaving the rail under any catastrophic or abnormal conditions.

Vehicle Railways

Figure 6:
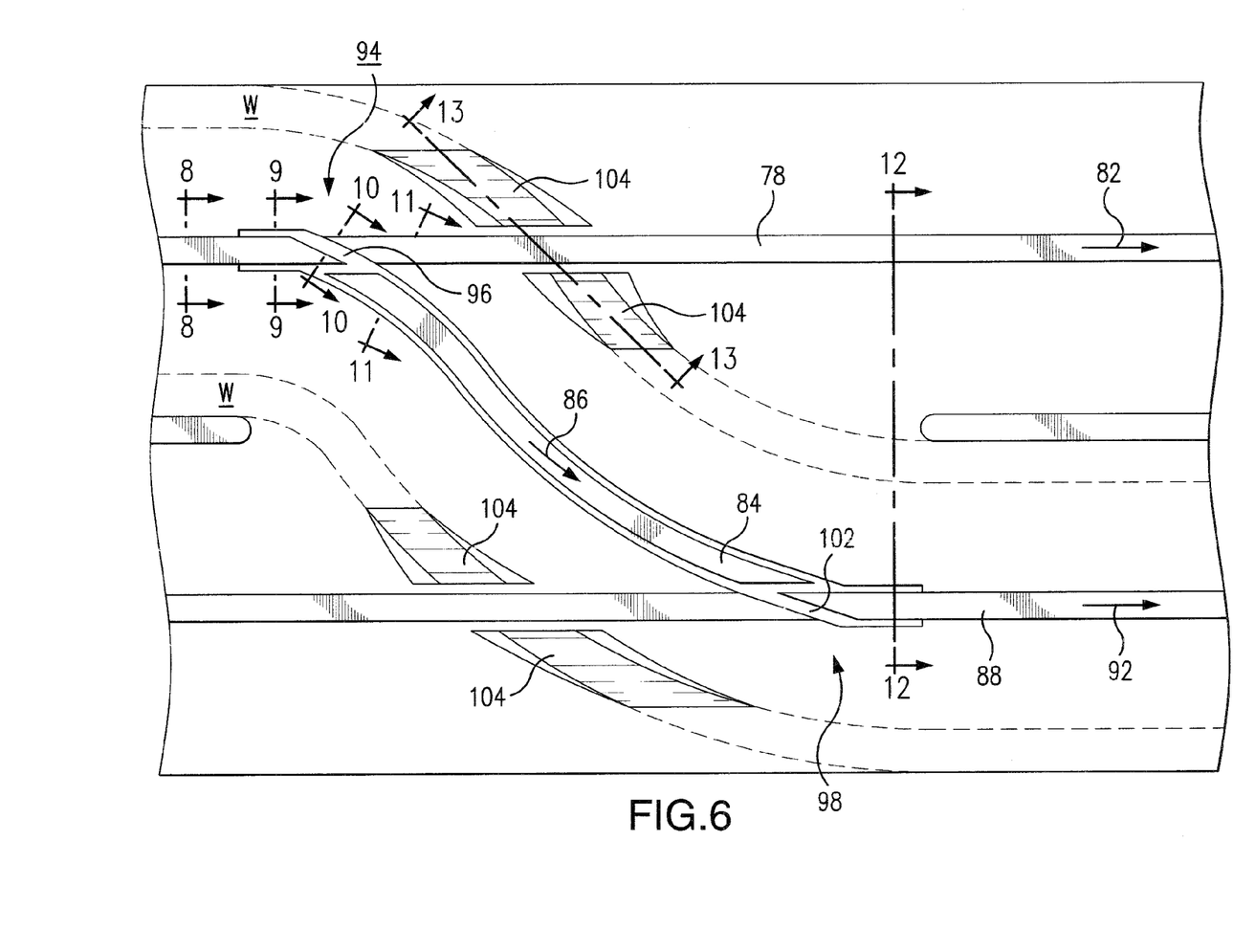
FIG. 6 is a plan view of the roadways of the present invention.

Vehicle 22 is designed to travel upon roadways while being guided by a rail. In the depicted embodiment, three separate rails (78, 84, 88) are provided. The first and third (78 and 88) rails define distinct paths and follow two different pathways (82 and 92). A second rail 84 is used to interconnect the first and third rails (78 and 88) and also defines a pathway 86 that intersects the other pathways (82 and 92).

Figure 7:
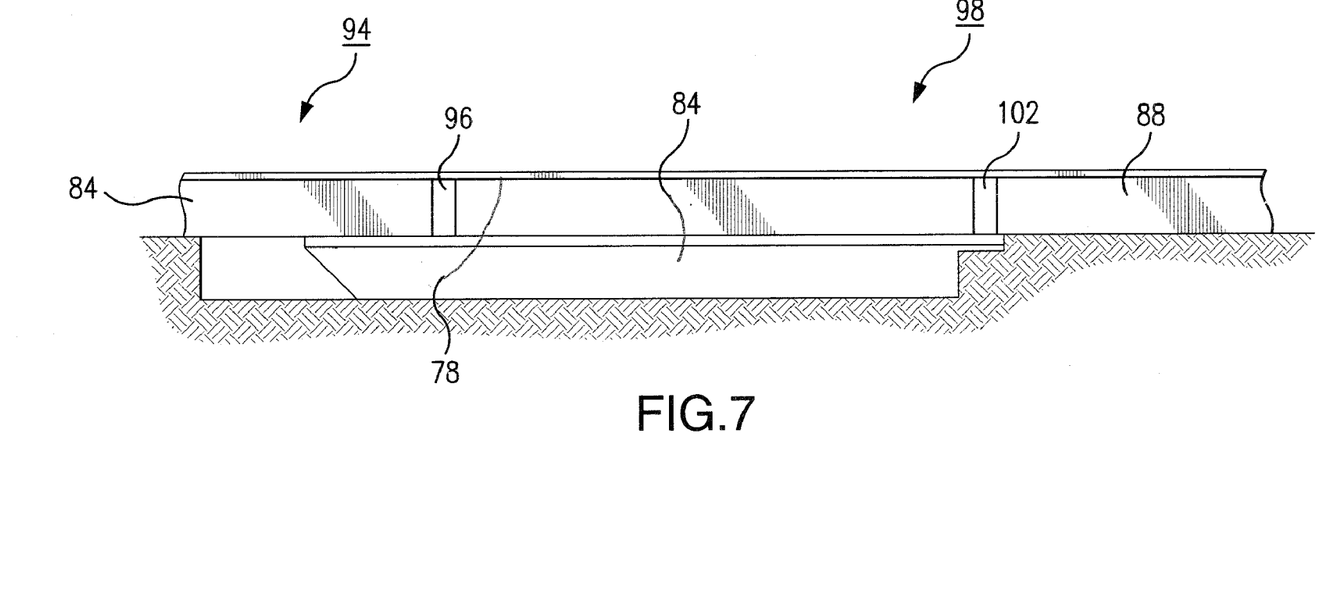
FIG. 7 is a sectional view of a transition area.
Figures 8, 9, 10, 11, 12, 13:
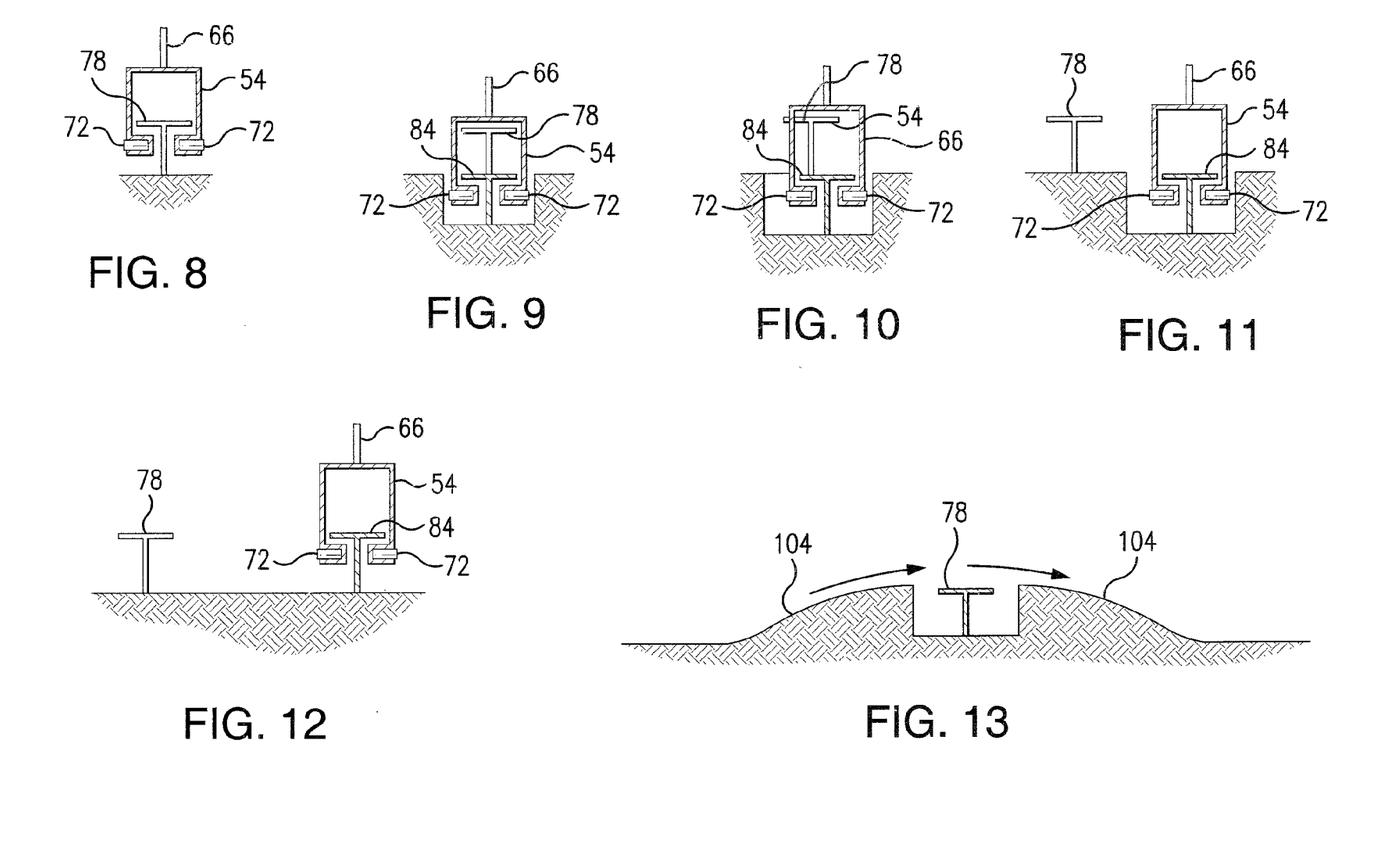
FIGS. 8-13 are sectional view of the rails taken from FIG. 6.

In the depicted embodiment, the first and third rails (78 and 88) are positioned above the roadway and the second rail 84 is recessed within the roadway. As illustrated, second rail 84 is recessed such that the surface of rail 84 is flush with the roadway. However, rail 84 can be recessed to a greater or lesser degree as desired. A first transition area 94 is located along the area where the first rail 78 intersects the second rail 84. Likewise, a second transition 98 area is located along the area where the second rail 84 intersects the third rail 88. In the first transition area 94, a two tiered rail is used. Namely, first rail 78 is positioned over and is secured to the top of the second rail 84 within the first transition area 94. Furthermore, a gap 98 is formed in the first rail 78 along the transition area 94. This gap 98 takes the form of a space formed within the rail. A similar second gap 102 is positioned within the third rail 88 along the second transition area 98.

Thus, vehicle 22 can travel along the first pathway 82 by engaging the saddle assembly 52 with the first rail 78. By keeping the saddle assembly 52 upon the first rail 78, vehicle 22 does not change roadways. However, vehicle 22 can be selectively transferred to the second pathway 86. This is accomplished by the on-board computer 28 lowering the saddle assembly 52 downwardly within the first transition area 94. In this regard, the transition area 94 includes a space prior to the start of the second rail 84. This permits the saddle hood 54 to be dropped without being damaged. Once dropped, the saddle hood 54 engages to both the first and second rails (78 and 84). This is possible due to the stacked arrangement of the rails. Once both rails (78 and 84) are engaged, vehicle 22 has committed to changing paths. Thereafter, vehicle 22 can be switched to ride exclusively upon the second rail 84 by guiding the saddle assembly 52 through the gap 96 in the first rail 78. The transfer to the third rail 88 is completed by guiding the saddle hood 54 into the second gap 102 along the second transition are 98a. In this manner, vehicle 22 can be transferred to different roadways without having to disengage a rail.

Vehicle Control

Several monitoring systems will make certain that no other vehicle is on roadway that could collide with the vehicle. This prevents collisions both on a single roadway and collisions from vehicles transferring to different roadway. During transfer it is also important that the saddle assembly 52 fully downwardly extended to engaged both the first and second rails. Damage could occur if the saddle is somewhere between fully up or fully down in the transition area. Several mechanical means can be used such as horizontal flaps alongside the rail that will force the saddle either up or down.

A mechanical collar position lock 70 can be included as an additional back-up safety device. This collar position lock is rotatable in a direction and it rolls over the saddle support rod 64 locking it in a full down position. If it rotates the other way it will lift the saddle support rod 64 back up into the normal position if by chance the saddle support rod 64 is not completely in the down position. In alternative embodiment, the collar position lock cooperates with cut outs in the support rod 64 to keep the collar 56 and hood 54 in either the fully extended or fully retracted positions.

The third sensor 76 is located on the top of the saddle is used to confirm, on a current run time basis, the vertical position of the saddle relative to the rail. Any of a variety of sensors can be used for this purpose. Thus, the third sensor 76 confirms to the on-board computer 28 that the saddle and collar 56 are either in the completely up or the completely down position. This prevents malfunctions or accidents from occurring in the transition area.

With the saddle assembly 52 extended down vehicle 22 moves to a point where the saddle is wrapped around both the first and second rails. Thereafter, the saddle passes through the gap 96 in the first rail 78. After passing through the gap 96, the saddle assembly 52 is free of first rail 78. However, the saddle assembly 52 is still extended down because the second rail 84 is still recessed within the roadway. Thereafter, at the second transition 98 the second rail 84 joins the third rail 88. Here, the saddle assembly 52 passes through a gap 102 in the third rail 88. At this point, vehicle 22 is completely engaged with third rail 88.

In both transition areas, the wheels 34 of vehicle 22 must pass over the rails. Namely, the left wheels 34 of vehicle 22 have to pass over the first rail 78 in the first transition area 94.

Likewise, the right wheels 34 must pass over the third rail 88 in the second transition area 98. There are several alternate ways to accomplish this. In the preferred embodiment, ramps or hills 104 are included on either side of the rail. Vehicle 22 will generally be moving at a speed to permit vehicle 22 wheels 34 to jump over the gap. This also adds a natural feeling to the vehicle occupants because it helps counter centrifugal forces during the turn. In FIG. 6, the paths of wheels 34 are indicated by "W."

The transitional second rail 84 is recessed in a trench within the roadway with the top of the rail flush with the roadway along the length of the second pathway. The second rail 84 starts out below the first rail 78 at that start of first transition area 94 and remains at the same level until it ends at the second transition area 98 beneath the third rail 88. Vehicle 22 is at all times securely protected from falling off or flying off the roadway by the saddle assembly 52 because the collar 56 and saddle hood 54 are always wrapped around one of the rails. It is unlikely that any abnormal event or collision could generate enough force to pull this vehicle off the roadways. However, if everything is working properly then no part of the saddle assembly 52 is ever in physical contact with the backbone.

Brake 68 would be mounted probably somewhere on the saddle assembly 52 in a position to jamb a braking pad between the collar 56 and the backbone. The pad could start with a softer material and proceed to a hard material. If for some reason vehicle 22 has to stop immediately then this brake would jamb a hard material pad between the collar 56 and the backbone.

ALTERNATE EMBODIMENTS

There are some alternate embodiments that may be used for switching vehicle 22 between roadways. All of the alternative embodiments use the ramps 104 to permit the wheels 34 to cross the rail.

Figure 14:
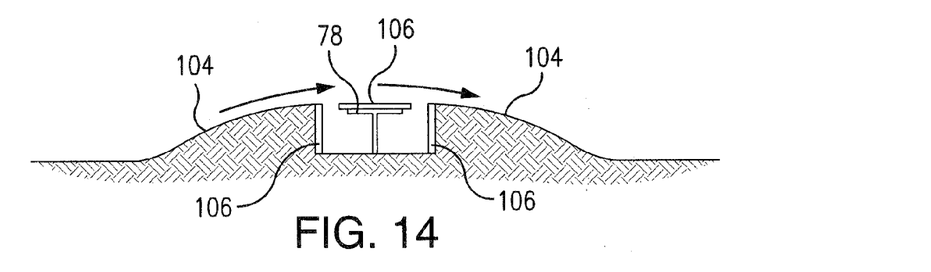
FIGS. 14-18 are view of alternative embodiments of the present invention.

In the first alternative embodiment, there would be flanges 106 on each side of the saddle assembly 52 to center it on the backbone rail. This allows the trench to be made almost as narrow as the saddle assembly 52. A metal plate 106 is placed on the backbone rail that is almost as wide as the inside of the saddle hood 54. This reduces the width of the two gaps the exiting or merging vehicle 22 has to jump when changing roadways.

Figure 15:
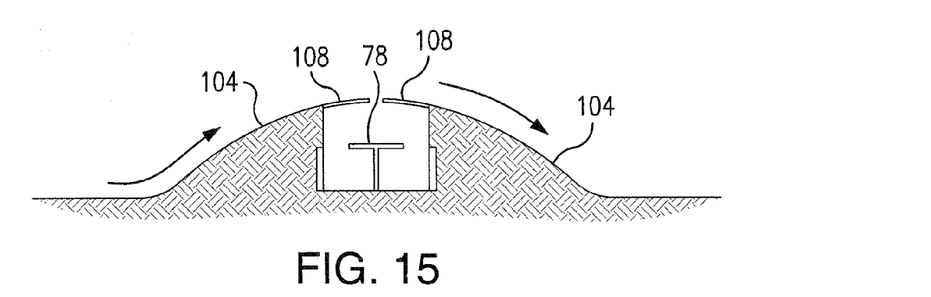

In another alternate embodiment, the ramps 104 on either side of the rail are made much higher. They are made high enough so the saddle of any passing vehicles will be below the ramps and only the saddle support rod 64 would be passing through the gap. This leaves only one small gap for the wheels 34 to jump at an angle.

Figure 16:
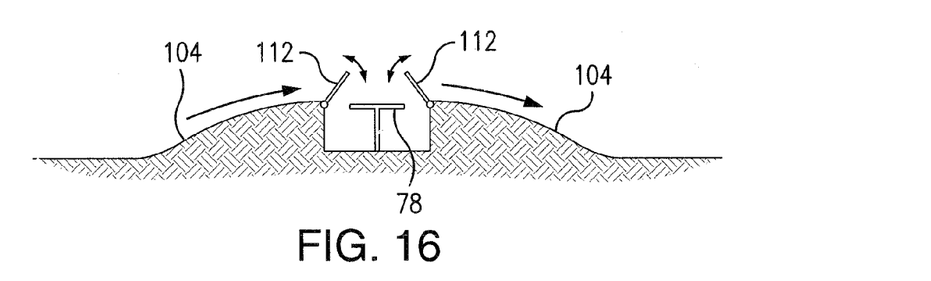
Figure 17:
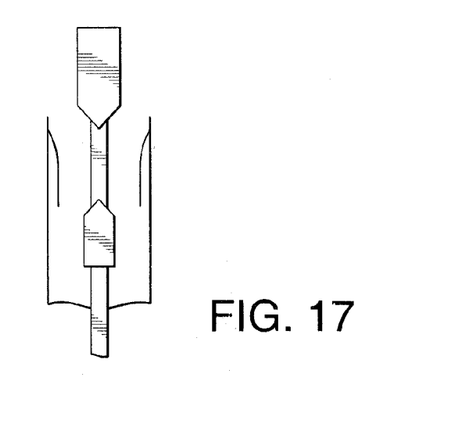

In yet another alternative embodiment, a pair of hinged plates 112 are pressed into place by the weight of vehicle 22 (the two sides would be mechanically linked) and go down like a drawbridge for vehicle 22 to pass over and spring back up immediately after. All three of these alternates may work better when the vehicles involved are traveling at slower speeds.

Figure 18:
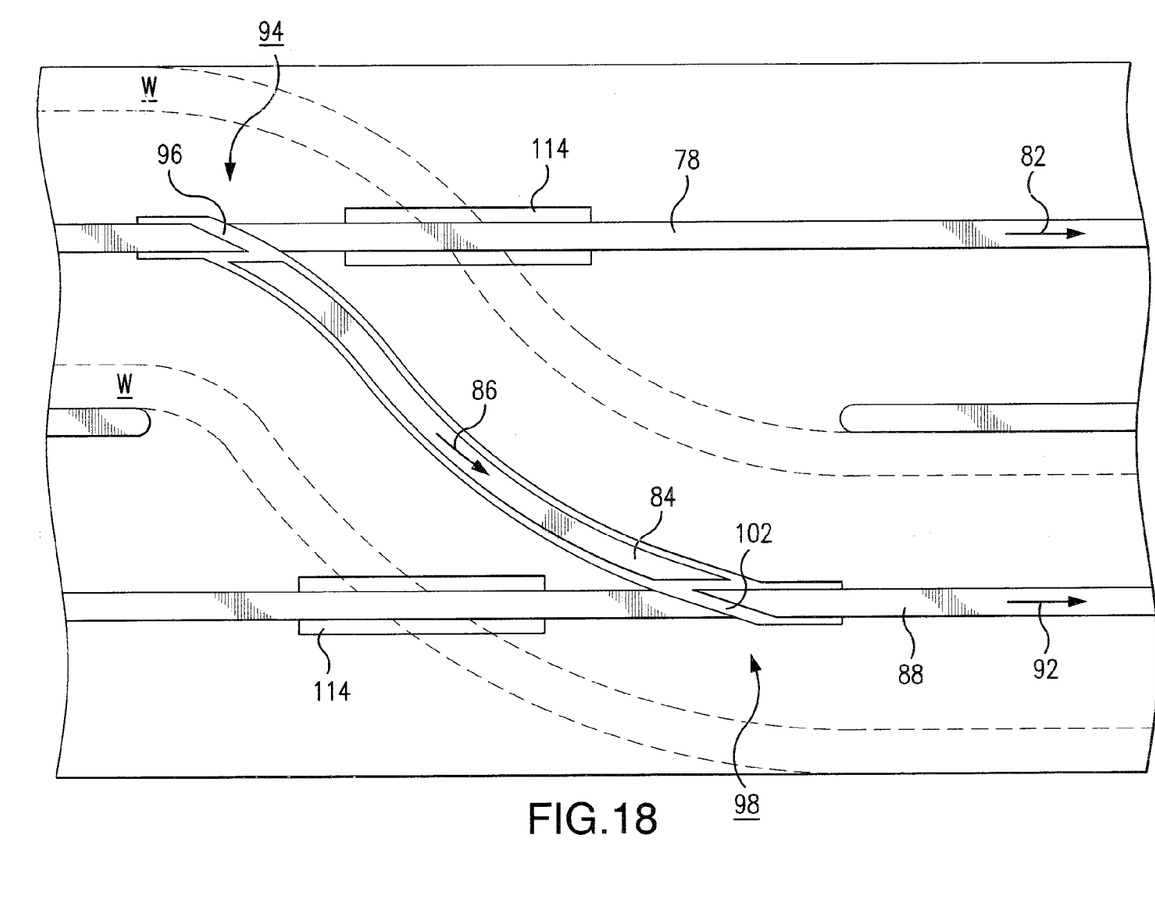

A final embodiment addresses the matter of getting vehicle wheels 34 over the rails during transfer. In this embodiment the first and third rails are positioned into a recess 114 in the roadway so the wheels 34 can simply pass over.

If vehicle 22 is bimodal, that is, able to operate on the automated system 20 and also on conventional roads then the driver of vehicle 22 who is bringing vehicle 22 off the conventional road and onto the automated road will enter an access ramp with steep curbs on each side. This system is described in co-pending application Ser. No. 61/221,669 and entitled "Automated Guideway Infrastructure," the contents of which are incorporated herein. The driver is assisted by the second group to sensors 74 which are looking to each side. These sensors 74 can also provide visual information to help the driver center vehicle 22 so the saddle assembly 52 passes over onto the backbone.

When the vehicle 22 is operating on a conventional road the driver steers vehicle 22 with a simple control box and joystick that connects into the vehicle computer 28. Pushing the joystick forward accelerates vehicle 22 forward. Pulling back slows it down and eventually applies brakes to stop. Pushing joystick left or right turns vehicle 22 accordingly through the primary or secondary steering system. This joystick could have numerous embodiments.

It should be noted that the saddle assembly 52 and backbones shown could have many physical configurations in this disclosure as long as they provide the functionality claimed. It should be noted that any vehicles traveling through on either roadway would be completely unaffected and undisturbed by the vehicle that is changing roads. In other words, vehicles passing through the switch that are not making a guideway change are not affected at all by vehicles that are switching off of the roadway. It should be noted that the preferred embodiment for a vehicle to be able to change roads has no moving parts in either roadway or the transitional segment. The infrastructure is said to be passive.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A vehicle control system for controlling the path of a vehicle along an engaged rail and over a roadway, the control system comprising:

a vehicle having a centerline, a chassis, an on-board computer, a series of wheels, an electric motor powering each of the wheels, a primary steering yoke and a primary steering actuator adapted to steer the vehicle via the on-board computer, a secondary steering yoke and a secondary steering actuator adapted to steer the vehicle in emergency conditions via the on-board computer;

a saddle assembly adapted to engage a rail, the saddle assembly including a saddle hood and a collar, the saddle hood including downwardly extending sidewalls and inwardly directed lower edges, the collar interconnected to an end of the saddle hood, a support rod having a first end connected to the collar and a second end interconnected to the chassis, a positioning mechanism for vertically adjusting the saddle assembly relative to the chassis, a breaking mechanism for stopping the vehicle, the breaking mechanism interconnected to the saddle hood and controlled by the on-board computer;

a first rail positioned above the roadway and defining a first pathway, a second rail recessed within the roadway and defining a second pathway, a transition area wherein the first rail is positioned over the second rail and a gap is formed in the first rail, wherein the vehicle is directed along the first pathway by engaging the saddle assembly with the first rail, and wherein the vehicle can be selectively transferred to the second pathway by lowering the saddle assembly to engage both the first and second rails in the transition area and by directing the saddle assembly through the gap in the first rail;
a sensor array, the array including a first and second set of sensors mounted to the lower edges of the saddle hood, the first set of sensors monitoring the distance between the saddle hood and the engaged rail, the second set of sensors monitoring obstacles in the roadway, wherein the first set of sensors provides data to the on-board computer for steering the vehicle in a manner to keep the centerline over the engaged rail, and wherein the second set of sensors provides data to the on-board computer for engaging the braking mechanism in the event an obstacle is detected.

2. A control system for guiding a vehicle over a roadway, the system comprising:
a vehicle having a centerline, a chassis, an underside, and an on-board computer for steering the vehicle;
a saddle hood connected to the underside of the vehicle, the saddle hood including downwardly extending sidewalls, a positioning mechanism for vertically adjusting the saddle hood relative to the chassis;
a first rail positioned above the roadway and defining a first pathway, a second rail recessed within the roadway and defining a second pathway, a transition area wherein the first rail is positioned over the second rail and a gap is formed in the first rail, wherein the vehicle is directed along the first pathway by engaging the saddle hood with the first rail, and wherein the vehicle can be selectively transferred to the second pathway by lowering the saddle hood to engage both the first and second rails in the transition area and by directing the saddle assembly through the gap in the first rail, wherein after passage through the gap, the saddle hood is engaged only with the second rail;
a sensor associated with the saddle hood for monitoring the distance between the saddle hood and the engaged rail, the sensor providing data to the on-board computer for steering the vehicle in a manner to keep the centerline over the engaged rail.

3. The system as described in claim 2 wherein the vehicle is steered via a steering yoke and steering actuator.

4. The system as described in claim 3 wherein in emergency situations the vehicle is steered via a secondary steering yoke and a secondary steering actuator.

5. The system as described in claim 2 further comprising a second sensor associated with the saddle hood and providing data to the on-board computer regarding obstacles in the roadway.

6. The system as described in claim 5 further comprising a breaking mechanism that is engaged when the second sensor detects an obstacle.

7. The system as described in claim 2 further comprising a third sensor for detecting the vertical position of the saddle hood relative to the chassis.

8. A control system for guiding a vehicle along an engaged rail and over a roadway, the system comprising:
a vehicle having a centerline, a chassis, an underside, and an on-board computer for steering the vehicle;
a saddle hood connected to the underside of the vehicle, the saddle hood including downwardly extending sidewalls;
a sensor associated with the saddle hood for monitoring the distance between the saddle hood and the engaged rail, the sensor providing data to the on-board computer for steering the vehicle in a manner to keep the centerline over the engaged rail
a mechanism for adjusting the vertical position of the saddle hood relative to the chassis.

9. The system as described in claim 8 further comprising a first rail within the roadway and defining a first pathway, a second rail positioned within the roadway and defining a second pathway, a transition area wherein the first rail is positioned over the second rail and a gap is formed in the first rail, wherein the vehicle is directed along the first pathway by engaging the saddle hood with the first rail, and wherein the vehicle can be selectively transferred to the second pathway by positioning the saddle hood to engage both the first and second rails in the transition area and by directing the saddle assembly through the gap in the first rail, wherein after passage through the gap, the saddle hood is engaged only with the second rail.

* * * * *